(12) United States Patent
Johnson

(10) Patent No.: US 6,845,248 B1
(45) Date of Patent: Jan. 18, 2005

(54) BROADBAND WIRELESS SHARED RESOURCE NETWORK ARCHITECTURE

(75) Inventor: Harold W. Johnson, Roach, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 385 days.

(21) Appl. No.: 10/191,717

(22) Filed: Jul. 9, 2002

(51) Int. Cl.[7] .............................................. H04B 1/38
(52) U.S. Cl. ............................. 455/554.2; 455/550.1; 455/418; 379/399.01; 379/93.01
(58) Field of Search ..................... 455/554.2, 550.1, 455/418, 73, 7, 414.1, 431, 556.1, 454, 80, 552.1; 379/399.01, 93.01

(56) References Cited

U.S. PATENT DOCUMENTS 6,118,777 A * 9/2000 Sylvain ...................... 370/351

| | | | |
|---|---|---|---|
| 2002/0191760 A1 * | 12/2002 | Wattwood et al. ........ | 379/93.01 |
| 2003/0074391 A1 * | 4/2003 | Carter et al. ................ | 709/200 |
| 2003/0108191 A1 * | 6/2003 | Kerpez ................... | 379/399.01 |
| 2003/0115505 A1 * | 6/2003 | Unice .......................... | 714/34 |
| 2004/0006769 A1 * | 1/2004 | Ansari et al. ................. | 725/74 |
| 2004/0015608 A1 * | 1/2004 | Ellis et al. .................. | 709/246 |

\* cited by examiner

*Primary Examiner*—Nick Corsaro
*Assistant Examiner*—Tan Trinh (57) ABSTRACT

A DSL access multiplexer exchanges communications between DSL connections and premise connections. A premise wireless interface exchanges the communications between the premise connections and a wireless communication link. A network wireless interface exchanges the communications between the wireless communication link and network connections. The DSL connections, premise connections, and network connections are physically allocated to different service providers. The DSL access multiplexer, premise wireless interface, and network wireless interface maintain physical, spectral, and/or logical separation between the customer communications of the different service providers.

20 Claims, 5 Drawing Sheets

| RESOURCE<br>* INDICATES SHARED RESOURCE | SERVICE PROVIDER 150 | SERVICE PROVIDER 160 |
|---|---|---|
| DSL MODEMS | 101-103 | 104-106 |
| DSL CONNECTIONS | 107-109 | 110-112 |
| DSL ACCESS MULTIPLEXER* | 271 | 271 |
| PREMISE CONNECTION | 272 | 273 |
| PREMISE WIRELESS INTERFACE* | 274 | 274 |
| WIRELESS COMMUNICATION LINK* | 275 | 275 |
| NETWORK WIRELESS INTERFACE* | 276 | 276 |
| NETWORK CONNECTION | 123 | 124 |
| SERVICE NODE | 125 | 126 |

BROADBAND WIRELESS SHARED RESOURCE NETWORK ARCHITECTURE

BACKGROUND OF THE INVENTION

1. Field of the Invention

The invention is related to the field of broadband wireless communications, and in particular, to a network architecture that allows for shared resources among service providers.

2. Statement of the Problem

Broadband wireless technologies are being deployed by service providers to provide communication services to their customers. The network architectures being used in this deployment maintain a physical separation between the equipment of the different service providers. This physical separation avoids conflicts between service providers and allows each service provider to maintain their own quality-of-service. Different service providers operating in the same area also use different wireless spectrum for the same reason.

This physical separation also prevents resource sharing among service providers. Unfortunately, the inability to share resources inhibits multiple service providers from leveraging their combined traffic volumes to improve economies of scale and lower unit costs. Thus, each service provider is faced with higher costs. Typically, the higher costs are passed on to the customers of the service providers.

Wireless communication systems use various frequency spectra to transfer wireless communication signals. Microwave systems use spectrum between one gigahertz (GHz) and 30 GHz where one GHz equals one billion cycles per second. Free-space optical systems use spectrum above 10 THz where one THz equals one trillion cycles per second.

Weather events adversely affect wireless systems transmitting above 10 GHz. To address the weather problem, free-space optical systems have been combined with weather-resilient microwave systems transmitting at 2.4 GHz. Upon failure of the free-space optical system due to a weather event, the microwave system is used to transfer traffic formerly carried by the free-space optical system. Since the microwave system does not have the capacity to transfer all of this traffic, the traffic must be prioritized, so the higher priority traffic can be transferred while the lower priority traffic is stored for subsequent transmission. Thus, the transfer of the lower priority traffic is delayed, and if there is not enough storage, portions of the lower priority traffic may be lost altogether.

SUMMARY OF THE SOLUTION

The invention helps solve the above problems with a broadband wireless network architecture that allows service providers to share resources. Advantageously, physical, spectral, or logical separation is maintained, so service providers can avoid conflicts and maintain their own quality-of-service. Advantageously, the ability to share resources allows multiple service providers to leverage their combined traffic volumes to improve economies of scale and lower unit costs. The lower costs may be passed on to the customers of the service providers or used to improve network performance.

Examples of the invention include a broadband wireless shared resource network architecture and its method of operation. First customers of a first service provider have Digital Subscriber Line (DSL) modems configured to exchange first customer communications with first DSL connections. Second customers of a second service provider have second DSL modems configured to exchange second customer communications with second DSL connections. The broadband wireless shared resource network architecture comprises a shared DSL access multiplexer, shared premise wireless interface, and shared network wireless interface. The shared DSL access multiplexer is configured to exchange the first customer communications between the first DSL connections and a first premise connection, and to exchange the second customer communications between the second DSL connections and a second premise connection. The shared premise wireless interface is configured to exchange the first customer communications between the first premise connection and a first spectrum in a shared wireless communication link, and to exchange the second customer communications between the second premise connection and a second spectrum in the shared wireless communication link. The shared network wireless interface is configured to exchange the first customer communications between the first spectrum in the shared wireless communication link and a first network connection, and to exchange the second customer communications between the second spectrum in the shared wireless communication link and a second network connection. The first service provider has a first service node configured to exchange the first customer communications with the first network connection and provide first communication services to the first customers. The second service provider has a second service node configured to exchange the second customer communications with the second network connection and provide second communication services to the second customers.

In some examples of the invention, the first DSL modems, the first DSL connections, the first premise connection, the first network connection, and the first service node are physically separate from the second DSL modems, the second DSL connections, the second premise connection, the second network connection, and the second service node.

In some examples of the invention, the shared DSL access multiplexer maintains internal physical separation between the first customer communications and the second customer communications.

In some examples of the invention, the first spectrum uses a different frequency band from the second spectrum.

In some examples of the invention, the wireless communication link comprises Multichannel Multipoint Distribution Service communications, Local Mulipoint Distribution Service communications, V-Band communications, W-Band communications, or free-space laser communications.

DESCRIPTION OF THE DRAWINGS

The same reference number represents the same element on all drawings.

DETAILED DESCRIPTION OF THE INVENTION

Figure 1:
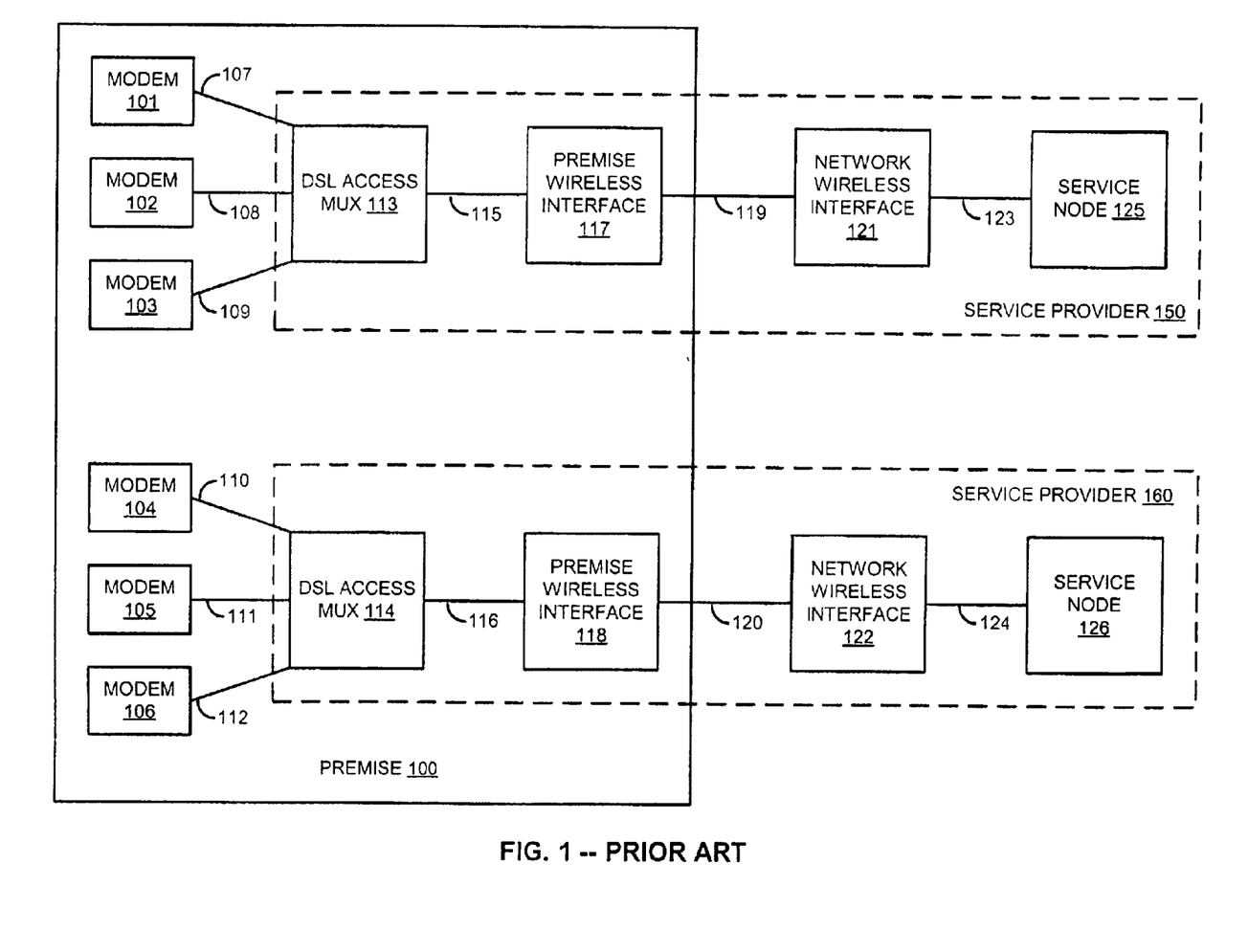
FIG. 1 illustrates a broadband wireless network architecture in the prior art.

Prior Art Broadband Wireless Network Architecture—FIG. 1

Prior to a description of the invention, a description of the prior art is first provided to facilitate a better appreciation and understanding of the invention as described further below. FIG. 1 illustrates a broadband wireless network architecture in the prior art. FIG. 1 shows premise 100, service provider 150, and service provider 160. Premise 100 includes DSL modems 101–106, DSL connections 107–112, DSL access multiplexers 113–114, premise connections 115–116, and premise wireless interfaces 117–118. Service provider 150 includes DSL access multiplexer 113, premise connection 115, premise wireless interface 117, wireless communication link 119, network wireless interface 121, network connection 123, and service node 125. Service provider 160 includes DSL access multiplexer 114, premise connection 116, premise wireless interface 118, wireless communication link 120, network wireless interface 122, network connection 124, and service node 126.

DSL access multiplexer 113 is coupled to DSL modem 101 over DSL connection 107, to DSL modem 102 over DSL connection 108, and to DSL modem 103 over DSL connection 109. DSL access multiplexer 113 is coupled to premise wireless interface 117 over premise connection 115. Premise wireless interface 117 is coupled to network wireless interface 121 over wireless communication link 119. Network wireless interface 121 is coupled to service node 125 over network connection 123.

DSL access multiplexer 114 is coupled to DSL modem 104 over DSL connection 110, to DSL modem 105 over DSL connection 111, and to DSL modem 106 over DSL connection 112. DSL access multiplexer 114 is coupled to premise wireless interface 118 over premise connection 116. Premise wireless interface 118 is coupled to network wireless interface 122 over wireless communication link 120. Network wireless interface 122 is coupled to service node 126 over network connection 124.

Premise 100 could be a building, facility, campus, or geographic area. Service providers 150 and 160 are each business entities that are separate from one another. Service providers 150 and 160 provide communications services to their respective customers. Communication services include telephone services, Internet access services, video delivery services, and other types of information transfer services.

DSL connections 107–112 could be twisted pair wires. DSL access multiplexers 113–114 could be non-blocking. Typically, there are more DSL modems and connections than the number shown. Premise connections 115–116 could be DS3 connections or some other type of communication links. Wireless communication links 119–120 could use Multichannel Multipoint Distribution Service (MMDS), Local Mulipoint Distribution Service (LMDS), V-Band, free-space laser, or some other type of broadband wireless technology. Network connections 123–124 could use Synchronous Optical Network (SONET) within a metropolitan area network ring or some of type of network communication technology.

Typically, premise wireless interfaces 117–118 each include an indoor unit that is coupled to an outdoor unit where the indoor units interface with premise connections 115–116, and the outdoor units interface with wireless communication links 119–120. Typically, network wireless interfaces 121–122 each include an outdoor unit that is coupled to an indoor unit that is coupled to a multiplexer, where the outdoor units interface with wireless communication links 119–120, and the multiplexers interface with network connections 123–124. Typically network wireless interfaces 121–122 are located in a hub facility.

In operation, customers of service provider 150 have DSL modems 101–103 to exchange customer communications with DSL access multiplexer 113 over DSL connection 107–109. DSL access multiplexer 113 exchanges the customer communications with premises wireless interface 117 over premises connection 115. Premises wireless interface 117 exchanges the customer communications with network wireless interface 121 over wireless communication link 119. Network wireless interface 121 exchanges the customer communications with service node 125 over network connection 123. Service node 125 processes the customer communications to provide communication services to the customers of service provider 150.

Customers of service provider 160 have DSL modems 104–106 to exchange customer communications with DSL access multiplexer 114 over DSL connection 110–112. DSL access multiplexer 114 exchanges the customer communications with premises wireless interface 118 over premises connection 116. Premises wireless interface 118 exchanges the customer communications with network wireless interface 122 over wireless communication link 120. Network wireless interface 122 exchanges the customer communications with service node 126 over network connection 124. Service node 126 processes the customer communications to provide communication services to the customers of service provider 160.

Broadband Wireless Shared Resource Network Architecture—FIGS. 2–5

FIGS. 2–5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 2:
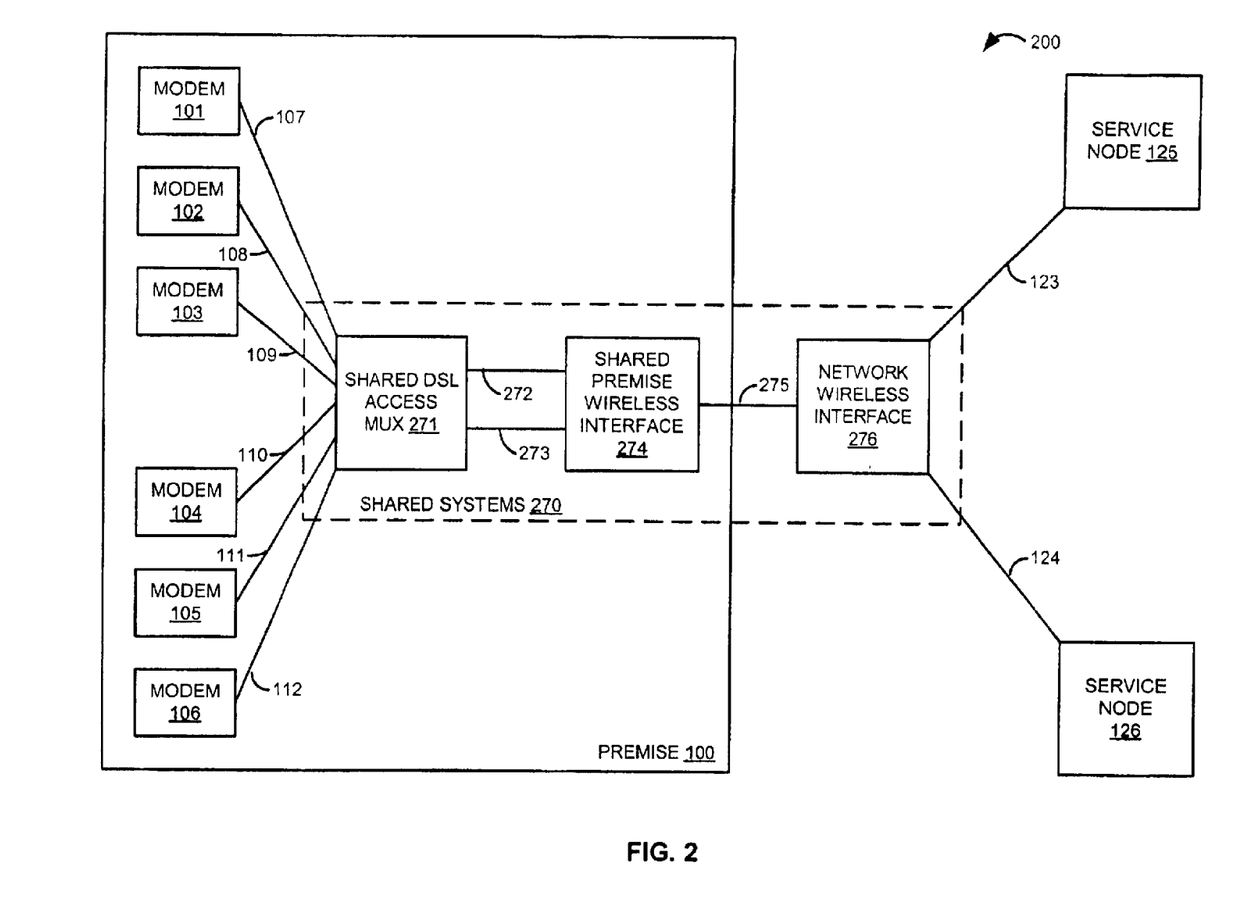
FIG. 2 illustrates a broadband wireless network architecture in an example of the invention.

FIG. 2 illustrates broadband wireless network architecture 200 in an example of the invention. FIG. 2 shows premise 100 and shared systems 270. Premise 100 includes DSL modems 101–106, DSL connections 107–112, shared DSL access multiplexer 271, premise connections 272–273, and shared premise wireless interface 274. Shared systems 270 include shared DSL access multiplexer 271, premise connections 272–273, shared premise wireless interface 274, shared wireless communication link 275, and shared network wireless interface 276. Except for premise connections 272–273, service providers 150 and 160 share the elements of shared systems 270. Service provider 150 includes network connection 123 and service node 125. Service provider 160 includes network connection 124 and service node 126.

Shared DSL access multiplexer 271 is coupled to DSL modem 101 over DSL connection 107, to DSL modem 102 over DSL connection 108, to DSL modem 103 over DSL connection 109, to DSL modem 104 over DSL connection 110, to DSL modem 105 over DSL connection 111, and to DSL modem 106 over DSL connection 112. Shared DSL access multiplexer 271 is coupled to shared premise wireless interface 274 over premise connections 272–273. Shared premise wireless interface 274 is coupled to shared network wireless interface 276 over shared wireless communication link 275. Shared network wireless interface 276 is coupled to service node 125 over network connection 123 and to service node 126 over network connection 124.

Premise 100 could be a building, facility, campus, or geographic area.

Service providers 150 and 160 are each business entities that are separate from one another. Separate business entities means that neither business entity owns a majority share of the other business entity. Service providers 150 and 160 provide communications services to their respective customers. Communication services include telephone services, Internet access services, video delivery services, and other types of information transfer services. A customer of a service provider is a person, business, or other entity that pays money to the service provider in exchange for a communication service from the service provider.

DSL modems 101–106 could be conventional. DSL connections 107–112 could be twisted pair wires. Shared DSL access multiplexer 271 could be conventional and could be non-blocking. Typically, there are more DSL modems and connections than the number shown. Premise connections 272–273 could be DS3 connections or some other type of communication links where service provider 150 uses premise connection 272, and service provider 160 uses premise connection 273. Shared wireless communication link 275 could use MMDS, LMDS, V-band, free-space laser, or some other type of broadband wireless technology. Network connections 123–124 could use SONET within a metropolitan area network ring or some of type of network communication technology.

Typically, premise wireless interface 274 includes an indoor unit that is coupled to an outdoor unit where the indoor unit interfaces with premise connections 272–273, and the outdoor unit interfaces with shared wireless communication link 275. Typically, shared network wireless interface 276 includes an outdoor unit that is coupled to an indoor unit that is coupled to a multiplexer, where the outdoor unit interfaces with shared wireless communication link 275, and the multiplexer interfaces with network connections 123–124. Typically, shared network wireless interface 276 is located in a hub facility.

In operation, customers of service provider 150 have DSL modems 101–103 to exchange customer communications with shared DSL access multiplexer 271 over DSL connection 107–109. Shared DSL access multiplexer 271 exchanges the customer communications with shared premises wireless interface 274 over premises connection 272. Shared premises wireless interface 274 exchanges the customer communications with shared network wireless interface 276 over shared wireless communication link 275. Shared network wireless interface 276 exchanges the customer communications with service node 125 over network connection 123. Service node 125 processes the customer communications to provide communication services to the customers of service provider 150.

Customers of service provider 160 have DSL modems 104–106 to exchange customer communications with shared DSL access multiplexer 271 over DSL connection 110–112. Shared DSL access multiplexer 271 exchanges the customer communications with shared premises wireless interface 274 over premises connection 273. Shared premises wireless interface 274 exchanges the customer communications with shared network wireless interface 276 over shared wireless communication link 275. Shared network wireless interface 276 exchanges the customer communications with service node 126 over network connection 124. Service node 126 processes the customer communications to provide communication services to the customers of service provider 160.

The customer communications for the customers of service provider 150 remains separated from the customer communications for the customers of service provider 160. This separation can be physically accomplished by each service provider using its own equipment for DSL modems 101–106, DSL connections 107–112, premise connections 272–273, network connections 123–124, and service nodes 125–126. For service provider 150, DSL access multiplexer 271 maps DSL connections 107–109 to premise connection 272. For service provider 160, DSL access multiplexer 271 maps DSL connections 110–112 to premise connection 273. Thus, shared DSL access multiplexer 271 maintains internal physical separation between the customer communications of service provider 150 and service provider 160.

This separation is logically or spectrally accomplished in shared systems 270. In some examples, shared premise wireless interface 274 could exchange the customer communications for service provider 150 between premise connection 272 and a first spectrum in shared wireless communication link 275. Shared premise wireless interface 274 could exchange the customer communications for service provider 160 between premise connection 273 and a second spectrum in shared wireless communication link 275. The first spectrum and the second spectrum use different frequency bands from one another that do not overlap. Other forms of logical separation could be used in other examples.

Figure 3:
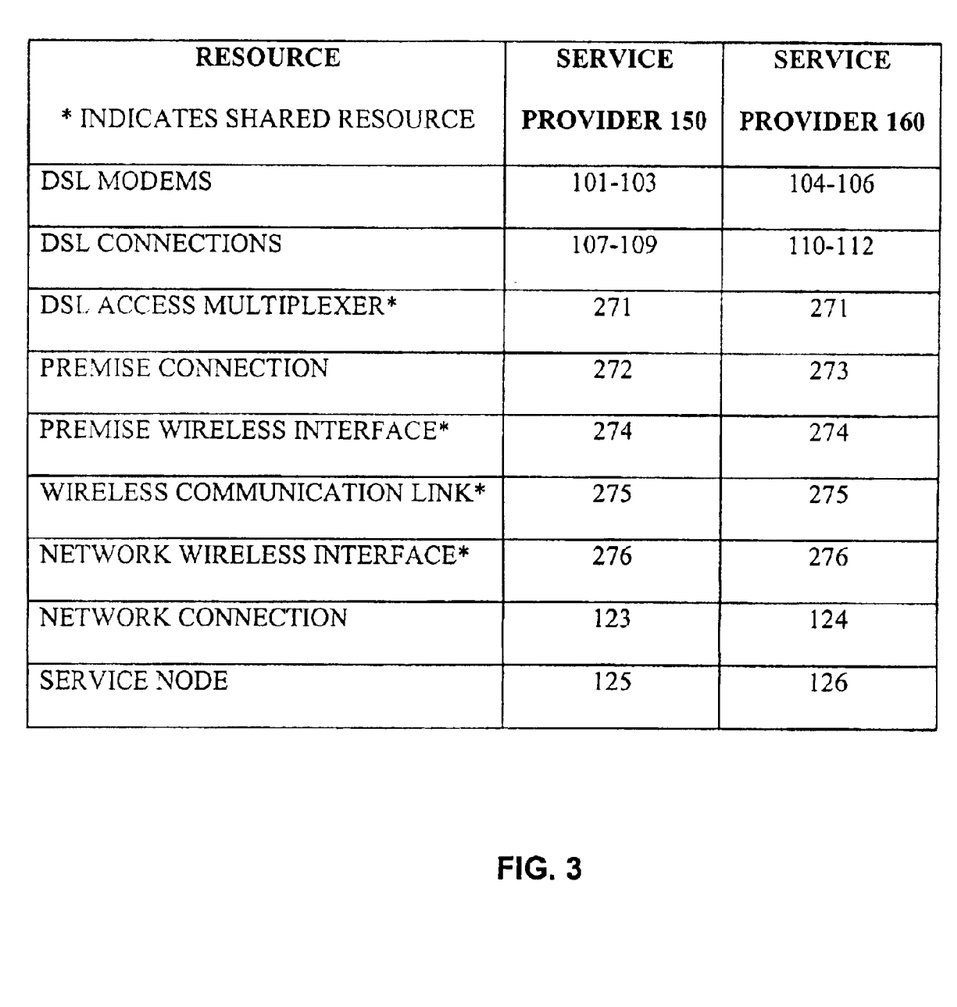
FIG. 3 illustrates shared resources of the broadband wireless network architecture in an example of the invention.

FIG. 3 illustrates the shared resources of the broadband wireless network architecture in an example of the invention. An asterisk on FIG. 3 indicates a shared resource. Within the shared resources, different spectral channels or other logical techniques are used to maintain separation between customer communications for service provider 150 and customer communications for service provider 160.

Figure 4:
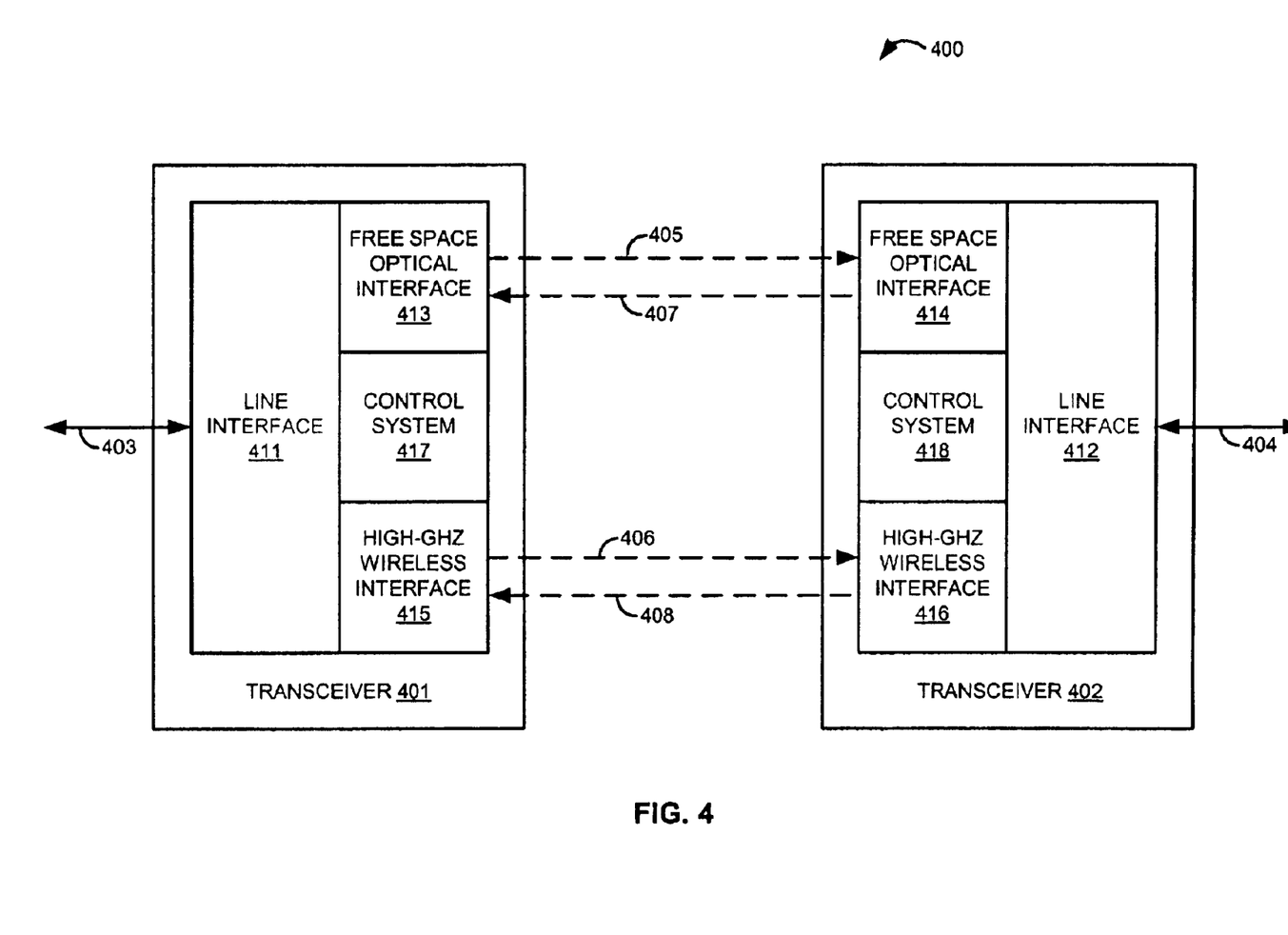
FIG. 4 illustrates a wireless communication system in an example of the invention.

FIG. 4 illustrates wireless communication system 400 in an example of the invention. Wireless communication system 400 could be used for shared wireless interfaces and link 274–276 of FIG. 2 in some examples of the invention, although other systems could be used in other examples of the invention.

Communication system 400 includes transceivers 401 and 402. Transceiver 401 includes line interface 411, free-space optical interface 413, high-GHz wireless interface 415, and control system 417. Transceiver 402 includes line interface 412, free-space optical interface 414, high-GHz wireless interface 416, and control system 418. Line interface 411 is coupled to communication link 403, and line interface 412 is coupled to communication link 404.

Based on this disclosure, those skilled in the art will appreciate how to modify existing communication systems to make communication system 400. Interfaces 411–416 could be conventional devices in some examples of the invention, or could be readily adapted from conventional devices in other examples of the invention. Control systems 417 and 418 could be comprised of processing circuitry. For example, application specific integrated circuitry could be fabricated to form control systems 417 and 418. In addition, general purpose microprocessors and memory along with software could be used for control systems 417 and 418. Transceivers 401 and 402 could each be implemented within a single housing or form factor.

Line interface 411 receives information from communication link 403 and transfers the information to both free space optical interface 413 and high-GHz wireless interface 415. Free-space optical interface 413 receives the information from line interface 411 and transfers free-space optical signal 405 carrying the information. High-GHz wireless interface 415 receives the information from line interface 411 and transfers high-GHz wireless signal 406 carrying the information. Free-space optical interface 414 receives free-space optical signal 405 carrying the information. High-GHz wireless interface 416 receives high-GHz wireless signal 406 carrying the information. Thus, interfaces 413–416 simultaneously transfer and receive the information in wireless signals 405–406.

Control system 418 assesses communication performance for free-space optical signal 405 and the high-GHz wireless signal 406. Based on the communication performance, control system 418 selects between free-space optical signal 405 and high-GHz wireless signal 406 to provide the information. Line interface 412 receives the information from free-space optical interface 414 or high-GHz wireless interface 416 based on the selection by control system 418. Line interface 412 transfers the information to communication link 404.

Line interface 412 receives information from communication link 404 and transfers the information to both free space optical interface 414 and high-GHz wireless interface 416. Free-space optical interface 414 receives the information from line interface 412 and transfers free-space optical signal 407 carrying the information. High-GHz wireless interface 416 receives the information from line interface 412 and transfers high-GHz wireless signal 408 carrying the information. Free-space optical interface 413 receives free-space optical signal 407 carrying the information. High-GHz wireless interface 415 receives high-GHz wireless signal 408 carrying the information. Thus, interfaces 413–416 simultaneously transfer and receive the information in wireless signals 407–408.

Control system 417 assesses communication performance for free-space optical signal 407 and high-GHz wireless signal 408. Based on the communication performance, control system 417 selects between free-space optical signal 407 and high-GHz wireless signal 408 to provide the information. Line interface 411 receives the information from free-space optical interface 413 or high-GHz wireless interface 415 based on the selection by control system 417. Line interface 411 transfers the information to communication link 403.

In the context of the invention, the term "high-GHz" means between 10 GHz and 10 THz. High-GHz wireless signals 406 and 408 could be local multipoint distribution signals, V-band signals, W-band signals, or some other type of high-GHz signals that propagate through the air. Free-space optical signals propagate through the air at frequencies above 10 THz. Free-space optical signals 405 and 407 could be laser signals, infrared signals, or some other light wave signals that propagate through the air.

Control systems 417 and 418 could be implemented in various ways, and could be completely or partially integrated within interfaces 411–416. For example, interfaces 413 and 415 could transfer their received signals to an external control system 417 for performance assessment and signal selection, and control system 417 would transfer the information from the selected signal to line interface 411. Alternatively, interfaces 411 and 413 could include integrated portions of control system 417 to assess performance, and an external portion of control interface 417 could select and transfer the information based on the performance assessment. Control system 417 could be implemented completely within interfaces 411 and 413, or completely within line interface 411. Based on this disclosure, those skilled in the art will appreciate various other implementations that are also included in the invention.

Figure 5:
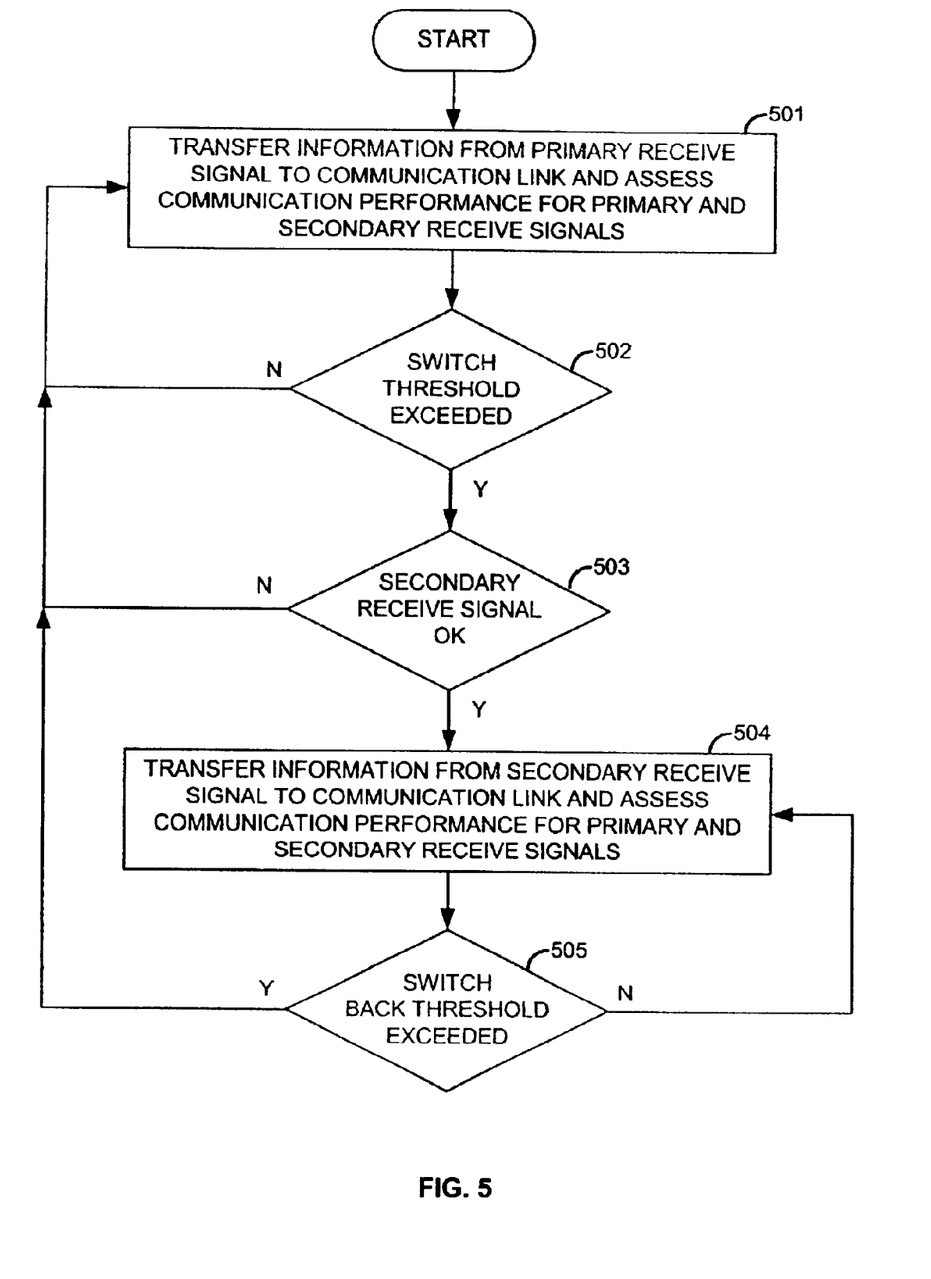
FIG. 5 illustrates wireless communication system operation in an example of the invention.

FIG. 5 illustrates communication system 400 operation in an example of the invention. The reference numbers from FIG. 5 are indicated parenthetically below. In this example, free-space optical signal 407 is the primary receive signal and high-GHz wireless signal 408 is the secondary receive signal. In addition, the operation is described for transceiver 401, and the operation for transceiver 402 would be similar.

To start transceiver 401 transfers the information from the primary receive signal to communication link 403 (501). Transceiver 401 also assesses communication performance for the primary and secondary receive signals (501). If the performance of the primary receive signal exceeds a switch threshold (502), and if the performance of the secondary receive signal is acceptable (503), then transceiver 401 transfers the information from the secondary receive signal to communication link 403 (504). Thus, transceiver 401 has switched from using free-space optical signal 407 to using high-GHz wireless signal 408 to provide the information to communication link 403.

Transceiver 401 continues to assess communication performance for the primary and secondary receive signals (504). If the performance of the primary receive signal exceeds a switchback threshold (505), then transceiver 401 again transfers the information from the primary receive signal to communication link 403 (501). Thus, transceiver 401 has switched back to using free-space optical signal 407 to provide the information to communication link 403. If desired, the switchback threshold can be selected to prevent premature switchbacks that result in continuous switching between primary and secondary receive signals.

Performance assessment could include bit errors, severe bit error seconds, framing errors, time without bit errors, time without severe bit error seconds, time without framing errors, and/or some other type of performance metric. One example of a severe bit error second is a one second time period that has a bit error rate of $10^{-3}$. Examples of the switch threshold could include a bit error rate or an average bit error rate, a number of consecutive severe bit error seconds or an average number of bit error seconds, a number of consecutive frame errors, an average number of frame errors, or some other type of performance metric. Examples of the acceptability of the secondary receive signal could include time without bit errors, time without severe bit error seconds, time without framing errors, bit error rate, average bit error rate, number of consecutive severe bit error seconds, average number of bit error seconds, number of consecutive frame errors, average number of frame errors, or some other type of performance metric. Examples of the switchback threshold could include time without bit errors, time without severe bit error seconds, time without framing errors, bit error rate, average bit error rate, number of consecutive severe bit error seconds, average number of bit error seconds, number of consecutive frame errors, average number of frame errors, or some other type of performance metric. Various combinations of the above metrics may be used for performance assessment.

Control systems 417–418 could be programmable and include a user interface. For example, the user interface could indicate available selections to a user and receive user selections from the user. The user interface could allow the user to select the primary and secondary receive signals. The user interface could allow the user to select the metrics or metric combinations that are used for the performance assessment. The user interface could allow the user to select settings and levels for these selected metrics.

The selection of primary and secondary receive signals can be based on weather patterns in the area. Free-space optical communications are adversely affected by fog and snow, so in areas with heavy fog or snow patterns, the high-GHz wireless signal might be the primary receive signal, and the free-space optical signal might be the secondary receive signal. High-GHz communications are adversely affected by rain or oxygen/carbon dioxide absorption, so in areas with heavy rain or oxygen/carbon dioxide absorption patterns, the free-space optical signal might be the primary receive signal, and the high-GHz signal might be the secondary receive signal.

Advantageously, free-space optical communications work well in weather patterns that adversely affect high-GHz wireless communications, and conversely, high-GHz wireless communications work well in weather patterns that adversely affect free-space optical communications. Since communication system 400 effectively switches between these systems based on communication performance, communication system 400 is able to provide highly-available wireless communication services at very high bandwidths.

What is claimed is:

1. A broadband wireless shared resource network architecture wherein first customers of a first service provider have Digital Subscriber Line (DSL) modems configured to exchange first customer communications with first DSL connections, and wherein second customers of a second service provider have second DSL modems configured to exchange second customer communications with second DSL connections, the broadband wireless shared resource network architecture comprising:

a shared DSL access multiplexer configured to exchange the first customer communications between the first DSL connections and a first premise connection, and to exchange the second customer communications between the second DSL connections and a second premise connection;

a shared premise wireless interface configured to exchange the first customer communications between the first premise connection and a first spectrum in a shared wireless communication link, and to exchange the second customer communications between the second premise connection and a second spectrum in the shared wireless communication link;

a shared network wireless interface configured to exchange the first customer communications between the first spectrum in the shared wireless communication link and a first network connection, and to exchange the second customer communications between the second spectrum in the shared wireless communication link and a second network connection; and wherein the first service provider has a first service node configured to exchange the first customer communications with the first network connection and provide first communication services to the first customers, and wherein the second service provider has a second service node configured to exchange the second customer communications with the second network connection and provide second communication services to the second customers.

2. The broadband wireless shared resource network architecture of claim 1 wherein the first DSL modems, the first DSL connections, the first premise connection, the first network connection, and the first service node are physically separate from the second DSL modems, the second DSL connections, the second premise connection, the second network connection, and the second service node.

3. The broadband wireless shared resource network architecture of claim 2 wherein the shared DSL access multiplexer maintains internal physical separation between the first customer communications and the second customer communications.

4. The broadband wireless shared resource network architecture of claim 3 wherein the first spectrum uses a different frequency band from the second spectrum.

5. The broadband wireless shared resource network architecture of claim 3 wherein the wireless communication link comprises Multichannel Multipoint Distribution Service communications.

6. The broadband wireless shared resource network architecture of claim 3 wherein the wireless communication link comprises Local Mulipoint Distribution Service communications.

7. The broadband wireless shared resource network architecture of claim 3 wherein the wireless communication link comprises V-Band communications.

8. The broadband wireless shared resource network architecture of claim 3 wherein the wireless communication link comprises free-space laser communications.

9. The broadband wireless shared resource network architecture of claim 3 wherein the wireless communication link comprises both high-GHz wireless communications and free-space laser communications.

10. The broadband wireless shared resource network architecture of claim 1 further comprising the first and second DSL modems.

11. A method of operating a broadband wireless shared resource network architecture wherein first customers of a first service provider have Digital Subscriber Line (DSL) modems that exchange first customer communications with first DSL connections, and wherein second customers of a second service provider have second DSL modems that exchange second customer communications with second DSL connections, the method comprising:

in a shared DSL access multiplexer, exchanging the first customer communications between the first DSL connections and a first premise connection, and exchanging the second customer communications between the second DSL connections and a second premise connection;

in a shared premise wireless interface, exchanging the first customer communications between the first premise connection and a first spectrum in a shared wireless communication link, and exchanging the second customer communications between the second premise connection and a second spectrum in the shared wireless communication link;

in a shared network wireless interface, exchanging the first customer communications between the first spectrum in the shared wireless communication link and a first network connection, and exchanging the second customer communications between the second spectrum in the shared wireless communication link and a second network connection; and wherein the first service provider has a first service node that exchanges the first customer communications with the first network connection and provides first communication services to the first customers, and wherein the second service provider has a second service node that exchanges the second customer communications with the second network connection and provides second communication services to the second customers.

12. The method of claim 11 wherein the first DSL modems, the first DSL connections, the first premise connection, the first network connection, and the first service node are physically separate from the second DSL modems, the second DSL connections, the second premise connection, the second network connection, and the second service node.

13. The method of claim 12 further comprising, in the shared DSL access multiplexer, maintaining internal physical separation between the first customer communications and the second customer communications.

14. The method of claim 13 wherein the first spectrum uses a different frequency band from the second spectrum.

15. The method of claim 13 wherein the wireless communication link comprises Multichannel Multipoint Distribution Service communications.

16. The method of claim 13 wherein the wireless communication link comprises Local Mulipoint Distribution Service communications.

17. The method of claim 13 wherein the wireless communication link comprises V-Band communications.

18. The method of claim 13 wherein the wireless communication link comprises free-space laser communications.

19. The method of claim 13 wherein the wireless communication link comprises both high-GHz wireless communications and free-space laser communications.

20. The method of claim 11 further comprising transferring the first customer communications over the first DSL connections to the shared DSL access multiplexer and transferring the second customer communications over the second DSL connections to the shared DSL access multiplexer.

* * * * *